UNITED STATES PATENT OFFICE 2,267,360

SOLVENT TREATMENT

Herbert O. Albrecht, Springfield, Pa., assignor to E. I. du Pont de Nemours & Company, Wilmington, Del., a corporation of Delaware No Drawing. Application August 16, 1939,
Serial No. 290,487

9 Claims. (Cl. 106—311)

This invention relates to the treatment of solvents and more particularly to the treatment of solvents used in varnishes, paints, lacquers and enamels of the type which require oxygen for the proper formation of the film.

It is known in the art that certain paint or varnish thinners, for example turpentine, after exposure to the air acquire properties which are imparted to coating compositions and result in a shorter drying time for the coating composition than when freshly distilled solvent or thinner is used. It has been proposed that this result is due to the formation of peroxides or other active bodies in the solvent or thinner. Considerable effort has been put forth to develop ways and means of increasing or stabilizing the peroxide content of certain types of organic compounds, which may be used as solvents or thinners, or increasing the rate of acquisition of the peroxides by such materials.

The role of solvents and/or thinners in the formation of films from paints, varnishes, enamels, etc., is a more active one than ordinarily understood. This has become particularly true with the use of the newer vehicles in such compositions. It is therefore highly desirable to improve and make more uniform the properties of the solvents and thinners which are concerned with their role in the formation of the protective and decorative films from the coating compositions.

This invention therefore has as a principal object the provision of means for imparting to or increasing certain properties of solvents and thinners, which properties are concerned with the drying of coating compositions in the formation of decorative and protective films.

Another object is the provision of means for rapidly and economically increasing the drying activity of certain types of solvents and thinners used in paints, varnishes, enamels and lacquers.

A further object is the provision of a method for treating solvents and thinners of certain types to improve their drying activity role when used in decorative and protective coating compositions without impairing their properties necessary as solvents or thinners.

Other objects will be apparent as the description of the invention proceeds.

These objects are accomplished by the treatment of the solvent or thinner with free oxygen, oxygen containing gases or nascent oxygen liberating materials in the presence of a soluble metallic soap of the metals comprising cobalt and manganese and if desired later removing from the solvent or thinner the precipitated metal.

The invention will be more fully understood from the description of the following examples although it is understood that I do not wish to be limited thereby except insofar as defined by the appended claims.

Example I

| | Parts by volume |
|---|---|
| Petroleum naphtha | 1,000 |
| Cobaltous naphthenate solution (containing 2% metallic cobalt) | 5 |
| Hydrogen peroxide (30% solution) | 5 |

The above materials are charged into a suitable container and vigorously agitated by any suitable means for approximately 15 minutes or until the violet-pink coloration of the liquid has changed to a relatively dark green coloration. The liquid is then allowed to stand for a period of from 2 to 5 days during which time a flocculent greenish precipitate forms and settles. The supernatant liquid is then decanted or the entire mass filtered by any suitable and convenient means. The decanted or filtered liquid hydrocarbon is now ready for use in protective and decorative coating compositions.

The petroleum naphtha used in the above example was of the so-called high solvency type prepared by sulphur dioxide extraction and having a boiling range of from approximately 140° C. to approximately 185° C. The cobaltous naphthenate solution was prepared in mineral spirits so that the solution contained 2% metallic cobalt. Weaker solutions of hydrogen peroxide may be used in proportionate amounts if desired.

A pigmented alkyd resin composition comprising as the non-volatile vehicle a 35–15% Chinawood-linseed oil modified glyceryl phthalate, carbon black and as the volatile vehicle the treated petroleum naphtha of the example in amount of 25% of the total composition was found to dry tack free in 5½ hours whereas a similar composition containing untreated petroleum naphtha required 7 hours to dry to a tack-free condition. A similar test with aged pigmented compositions resulted in an even greater difference in tack-free drying time viz. 8 hours versus 5½ hours.

Example II

| | Parts by volume |
|---|---|
| Coal tar naphtha | 1,000 |
| Cobaltous naphthenate solution (containing 2% metallic cobalt) | 5 |
| Hydrogen peroxide (30% solution) | 5 |

The procedure used in the treatment of the solvent was as described under Example I with the exception that the standing time was approximately 3 days. The treated solvent used in an alkyd resin coating composition was found to produce a composition which dried in 3 hours in comparison with 5 hours for a composition made from the untreated coal tar naphtha.

The coal tar naphtha had a boiling range approximately that of the petroleum naphtha used in Example I.

Example III

|  | Parts by volume |
|---|---|
| Mineral spirits | 1,500 |
| Cobaltous naphthenate solution (as in Examples I and II) | 7.5 |
| Hydrogen peroxide (30% solution) | 7.5 |

The procedure as used in Example I was followed and the treated mineral spirits used in an oil modified alkyd resin coating composition exhibited markedly improved drying properties over untreated material used in a similar composition.

Example IV

|  | Parts by volume |
|---|---|
| Steam distilled wood turpentine | 2,000 |
| Cobaltous naphthenate solution | 10 |
| Hydrogen peroxide (30% solution) | 10 |

The above materials were treated according to the procedure described under Example I. Improved drying properties were shown by an oleoresinous pigmented composition containing the treated turpentine over a similar composition containing the untreated material.

Gum turpentine may be used in place of the wood turpentine noted in the example.

While the examples describe the treatment of hydrocarbon solvents, other solvents used in the paint, varnish, enamel and lacquer industry, as well as additional hydrocarbon solvents e. g. hydrogenated naphthalene, etc. may be treated according to the present invention to improve their drying properties. Among such may be noted dibutyl ether, paraldehyde, dimethyl-acetal of butyraldehyde, mono- and di- ethyl ether of ethylene glycol, the acetate of ethyl ether of ethylene glycol, ethyl, butyl and amyl acetate, etc. The choice of solvents to be treated is generally made from those having a boiling point or range of between 100° C. and 220° C. Such are the ones of those commonly used in the so-called air drying type coating compositions, which are not too volatile to be too rapidly removed from the film and thus produce the desired effect.

In place of the cobaltous naphthenate as noted in the examples, other driers may be used such as manganese naphthenate, cobalt or manganese salts of cocoanut oil acids, etc. The choice of the drier for use will be governed by various conditions such as cost, availability, etc. and will be readily apparent to those skilled in the art of using driers. The drier is preferably used in amounts ranging from .0005% to .01% (as metal) based on the weight of the solvent being treated. The limits of the preferred range are set merely by economic considerations for the upper limit and by practical result considerations for the lower limit. The use of amounts above and below the range given is well within the purview of the present invention. Other metals normally considered, the equivalent of cobalt and manganese such as nickel and iron, respectively, are not satisfactory. However, it is to be understood that manganese and cobalt salts of other acids may be used such as acids of cocoanut oil and similar long chain aliphatic mono-carboxylic acids.

As indicated under Example I, weaker solutions of hydrogen peroxide than 30% solution may be used in proportionate amount. The use of hydrogen peroxide may be replaced by bubbling air through the solvent containing the drier for a period ranging up to 3 weeks or the bubbling of the air through the solvent may be combined with the use of the hydrogen peroxide. The simple passage of air through the solvent with the drier is time consuming but accomplishes the desired result. Further, the air may be ozonized (e. g. to approximately 2% ozone) and passed through the solvent containing the drier. In such instance treatment for approximately six hours has been found to be satisfactory. The time of treatment may, however, be varied and will be governed by the particular result desired.

The treatment may be carried out in a glass container in which instance the solvent may be subjected to direct sunlight or an artificial source of light rich in ultra violet radiation. Under such conditions the time for attainment of the desired result may be materially shortened or in some instances a further improvement in the treated material is obtained.

While the procedure is ordinarily satisfactorily carried out at room temperature, the use of elevated temperatures may hasten the action and is therefore within the scope of the invention. It is desirable, however, not to use temperatures appreciably above 40° C. for reasons of safety and to avoid decomposition of relatively unstable desirable products formed in or during the treatment.

Where desirable or necessary the solvent, particularly the hydrocarbon solvents, may be subjected to an alkaline wash followed by a water wash or to an acid (preferably sulfuric acid) wash followed by alkaline and water washes before being subjected to the treatment as described herein. Such treatment is particularly applicable to materials which have not been previously subjected to sufficient refining treatment of hydrocarbon solvents as ordinarily available in commerce.

The solvents treated according to the process of the present invention are applicable for use in the manufacture of paints, varnishes, enamels and lacquers of various types.

It will be apparent that the above described means for imparting to or increasing certain properties of solvents and thinners which are concerned with the drying of coating compositions in which the solvents or thinners are used. Further, the means provided are rapid and economical and make more certain the reproducibility of drying results of various types of coating compositions in which the solvents and thinners are used. In addition, the treatment while improving the drying activity role of the solvents and thinners does not impair their properties which are necessary for their use as solvents or thinners.

It is apparent that many widely different embodiments of this invention may be made without departing from the spirit and scope thereof, and therefore, it is not intended to be limited except as indicated in the appended claims.

I claim:

1. The process of treating varnish thinners and solvents which comprises subjecting a mixture consisting essentially of a volatile varnish thinner or solvent to the action of an oxidizing agent in the presence of a fraction of a per cent of a soap dissolved therein of a metal selected from the group consisting of cobalt and manganese at a temperature below about 40° C., the action of the oxidizing agent being carried out in the absence of film-forming ingredients.

2. The process which comprises treating a liquid consisting essentially of a volatile organic varnish solvent with an oxidizing agent in the presence of a metallic naphthenate in solution soluble in the thinner or solvent, the metal of which is selected from the group consisting of cobalt and manganese at a temperature below about 40° C., in the absence of film-forming ingredients.

3. The process of claim 2 in which the oxidizing agent is hydrogen peroxide.

4. The process which comprises mixing in the absence of film-forming ingredients a varnish solvent or thinner with a salt of a mono-carboxylic acid, and an oxidizing agent, allowing the mixture to stand from about two to five days at a temperature below about 40° C., and subsequently decanting the supernatant liquid, said salt being of a metal of the group consisting of cobalt and manganese.

5. Process of claim 4 in which the solvent or thinner is petroleum naphtha.

6. Process of claim 4 in which the thinner is turpentine.

7. Process of claim 4 in which the salt is cobaltous naphthenate.

8. Process of claim 4 in which the salt is manganese naphthenate.

9. Process of claim 4 in which the metal of the salt is present in amount ranging from .0005% to .01% based on the weight of the solvent or thinner treated.

HERBERT O. ALBRECHT.